United States Patent [19]

Huber

[11] 3,978,327

[45] Aug. 31, 1976

[54] PROGRAM-CONTROLLED DATA PROCESSOR HAVING TWO SIMULTANEOUSLY OPERATING IDENTICAL SYSTEM UNITS

[75] Inventor: Josef Huber, Munich, Germany

[73] Assignee: Siemens Aktiengesellschaft, Berlin & Munich, Germany

[22] Filed: Jan. 23, 1975

[21] Appl. No.: 543,647

Related U.S. Application Data

[63] Continuation of Ser. No. 336,706, Feb. 28, 1973, abandoned.

[30] Foreign Application Priority Data

Mar. 13, 1972 Germany............................ 2212069

[52] U.S. Cl.................. 235/153 AE; 340/146.1 BE
[51] Int. Cl.²..................... G06F 11/08; G06F 15/16
[58] Field of Search............... 235/153 AE, 153 AK; 340/146.1 BE, 172.5

[56] References Cited
UNITED STATES PATENTS

| | | | |
|---|---|---|---|
| 3,517,174 | 6/1970 | Ossfeldt | 235/153 AE |
| 3,536,259 | 10/1970 | Okumura | 235/153 AE |
| 3,609,704 | 9/1971 | Schurter | 340/172.5 |
| 3,654,603 | 4/1972 | Gunning et al. | 235/153 AE |
| 3,735,356 | 5/1973 | Yates | 340/172.5 |
| 3,833,798 | 9/1974 | Huber et al. | 235/153 AE |
| 3,848,116 | 11/1974 | Moder et al. | 235/153 AE |

*Primary Examiner*—Charles E. Atkinson

[57] ABSTRACT

A program controlled data processor particularly useful in data transmission systems is described. In this system the central processing units communicate with central storage units, which receive all data and programs for carrying out switching functions. In order to increase the operational reliability at least two identically constructed storage units and/or at least two identically constructed processing units can be connected to operate in parallel performing the same functions concurrently and synchronously. The bits of information supplied by the parallel system units are compared and in case of malfunction or disturbance the transfer of information is inhibited. Comparator circuits are provided which can be selectively connected to any of the system units which are to be connected in parallel.

1 Claim, 2 Drawing Figures

PROGRAM-CONTROLLED DATA PROCESSOR HAVING TWO SIMULTANEOUSLY OPERATING IDENTICAL SYSTEM UNITS

This is a continuation of application Ser. No. 336,706, filed Feb. 28, 1973.

BACKGROUND OF THE INVENTION

The invention relates to a program-controlled data processor, more particularly a stored-program data processor for telecommunication systems used for transmitting for binary-coded messages.

In these systems central processing units communicate with central storage units, which receive all data and programs needed for the solution of switching functions. In order to increase the operational reliability of the systems, at least two identically constructed processing units and/or at least two identically constructed storage units are connected in parallel, such that they perform identical functions concurrently and synchronously. The units of information supplied by parallel-running system units are compared, and in case of malfunction the transfer of the units of information to the corresponding system units is prevented.

A program-controlled data processor of known construction, more particularly one employed as a data switching system (see, for example, commonly assigned U.S. Pat. application Ser. No. 61,692, filed Aug. 6, 1970, and now U.S. Pat. No. 3,669,362) is made up of a plurality of system units (FIG. 1 herein). The processing units and at least one storage unit are associated with these system units. The processing units are not connected together, and they communicate with the storage units independently of one another. A storage unit is made up of the working storage (e.g. a core storage containing the data and programs required for the solution of the switching functions), the memory operation control for processing the various storage operations, the storage request control for allocating the storage cycles to the requesting processing units, and the program request control for requesting programs through the processing units. The processing units are connected with the storage units via system standard terminals. The cycle requests of the processing units to the storage units are operated upon in accordance with the priority of their standard terminals connected to the storage. The cycle allocation and the control in the storage for processing storage requests are described, for example, in the commonly assigned U.S. application Ser. No. 57,926, filed July 24, 1970 and now U.S. Pat. No. 3,711,835.

To increase the operational reliability and availability of such a system, it is old to provide all or only specific units at least in duplicate using modular construction. Due to the interchangeability of identical system units, this construction affords the possibility, in case of malfunction of one system unit, of causing the functions thereof to be performed by any one of the other system units. The malfunctioning of at least one of the parallel running system units or an interference with the synchronism is determined by comparing the units of information supplied by the parallel units. If the synchronism of the parallel running system units is interfered with or if the units of information supplied thereto are dissimilar, the result of the comparison will cause the production of a fault signal. The above-referenced U.S. Pat. No. 3,669,362 discloses an arrangement for shunting a plurality of system units employing a comparator shared by a group of system units.

The system units are connected to the comparator continuously, or at least whenever parallel operation is desired. This common comparator is operated through grading or progressive interconnection with respect to time. In other words, parallel-connected system units use the comparator during a storage cycle allocated thereto and in the next storage cycle another group of parallel-connected system units is connected with the comparator. However, such common comparators which, for example, have to serve several pairs of parallel system units simultaneously, can not be employed in processing units operating at very high operating speeds. This arises out of the fact that, aside from the delay in the flow of data until the result of the comparison by the comparator is obtained, a further delay is necessary, because during an operating cycle the comparator can only operate upon the unit of information of a single pair of parallel system units.

This difficulty could be avoided by allocating comparators permanently to all groups of identical system units which are to be paralleled during the operation. In this case, special twin or multiple terminals would be needed in each system unit communicating with other parallel operating system unit. This will be explained in greater detail with reference to a twin terminal.

In this case, two inlets are assigned to a particular signal, e.g. the "cycle request" signal, which is transmitted by two processing units to a storage unit. These inlets are connected with the storage unit and with the comparator. These inlets must be coupled within the storage unit by means of gate circuits. Thus, such a twin terminal requires not only additional technical effort, which is proportional to the number of parallel terminals to be provided, but it also causes a loss of speed as a result of the comparison and the coupling of the inlets. Moreover, special twin terminals cannot be separated without changing the hardware. Hence, twin terminals also reduce the adaptability of the system to various applications.

An important object of the invention is, therefore, the provision of a program-controlled data processor of the type discussed hereinabove which avoids the difficulties of the prior art methods for paralleling system units.

SUMMARY OF THE INVENTION

The solution to the problem taught by the invention consists in providing for comparator circuits to be allocated to two parallel-running system units at a time which can be selectively connected to any system units to be paralleled.

The above solution admits of unrestricted capability for parallel connection of any standard terminals or system units with little complexity and expense. No additional mounting spaces for cable plugs are required for the parallel operation of system units. The existing standard terminals for independent operation of system units also fulfill their function in simultaneous operation without requiring changes, thus saving mounting spaces and circuits as compared with specially provided twin or triple terminals.

The switches needed for selectively connecting the comparators must be operated from the system units, i.e., by program control or manually. A change of cables is not necessary for the transition from the independent single operation to the synchronous parallel operation.

BRIEF DESCRIPTION OF THE DRAWINGS

The principles of the invention will be best understood by reference to the description of a preferred embodiment, given hereinbelow, in conjunction with the drawings which are briefly described as follows.

DETAILED DESCRIPTION OF THE DRAWINGS

Figure 1:
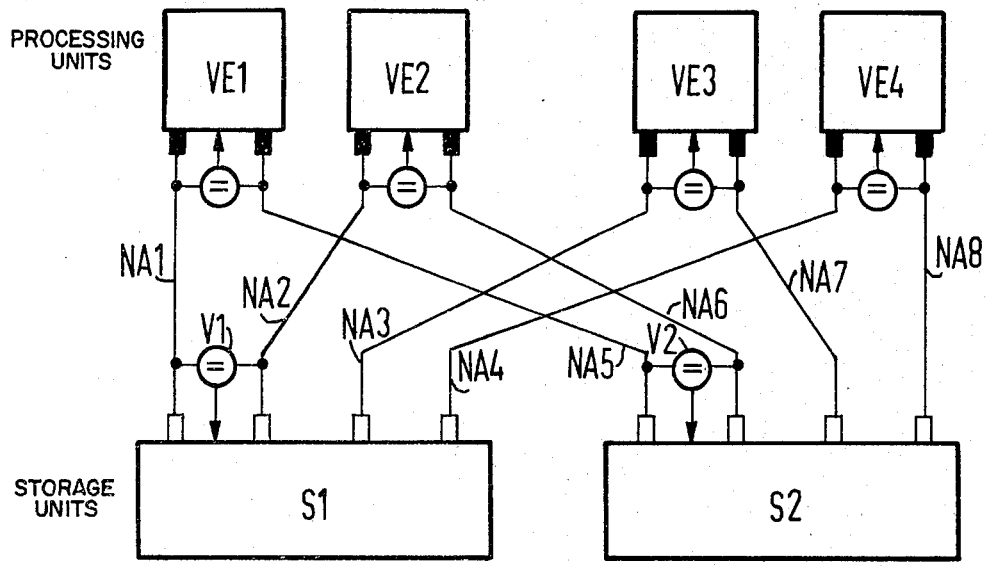
FIG. 1 is a block diagram of a program-controlled processing system.

FIG. 1 shows four processing units VE1 through VE4 which are connected over standard data terminals to two storage units operating in parallel. The storage units are operated synchronously and with identical storage contents. The processing units VE1 and VE2 may be connected in parallel. The construction of the aforementioned processing units, which in the case of a telecommunication system may be, e.g., line connection units, is described in detail in U.S. Pat. No. 3,660,824.

The cycle requests of the processing units to the storage units are treated in accordance with the priority of their standard terminals connected to the storage. The parallel-connected processing units VE1 and VE2 are treated by the storage request control of the storage unit with a priority which is identical to the higher storage priority, if the two processing units are operated independently. In the combination of system units assumed, the data transmitted to the storage unit S1 by the processing units VE1 and VE2 over the standard terminals NA1 and NA2 must be compared, as in the case with the data transmitted to the storage unit S2 by the processing units VE1 and VE2 over the standard terminals NA5 and NA6. Likewise, the flow of data from the parallel storage units S1 and S2 to the processing units VE1 through VE4 must be supervised for equality (NA1, NA5; NA2, NA6; NA3, NA7; NA4, NA8). In FIG. 1, the necessary comparators are identified by the circles enclosing an equal sign.

If the synchronism of the parallel processing units VE1 and VE2 is interfered with, or if for some other reason the bits of information supplied thereby are not identical, the result of the comparison leads to the production of a fault signal. Such a fault signal may, for example, be given to the storage request control of the storage unit S1 and would cause the connection between the processing units VE1 and VE2 and the storage unit S1 to be interlocked. However, it is also possible to still convert the current core storage cycle into a read cycle by a signal to the storage operation control. Then the bit of information, which may be faulty, is not received by the storage. The arrival of a fault signal from the comparator V1 is communicated to the parallel processing units VE1 and VE2 by the storage unit S1, and causes the disconnection of the two processing units. As an alternative, it might cause the transition from the parallel operation to the independent operation of the two processing units and subsequent checking of the units. Should the processing units VE3 and VE4 run parallel temporarily and the processing units VE1 and VE2 operate independently of one another, the comparators V1 and V2 can, respectively be selectively connected to the standard terminals NA3 and NA4, or NA7 and NA8, as the case may be.

Figure 2:
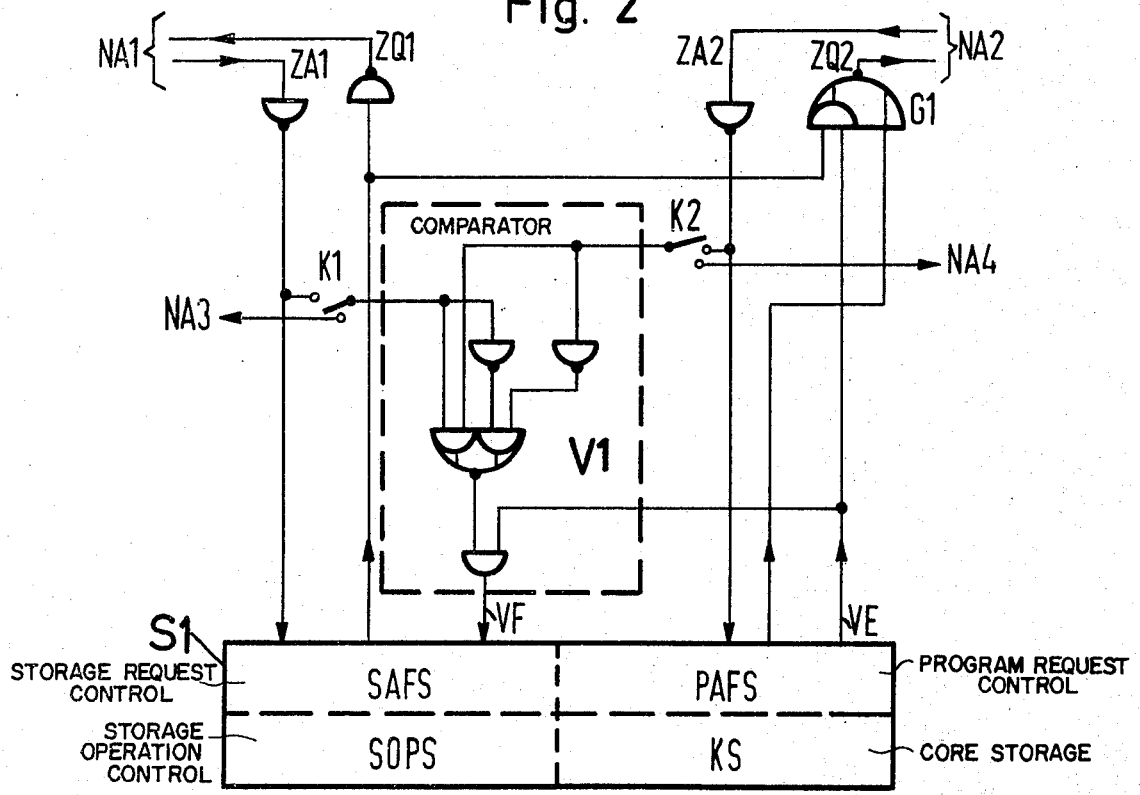
FIG. 2 illustrates a preferred embodiment of a parallel connection of two standard terminals and a comparator in accordance with the invention.

The construction of the standard terminals and of a comparator is shown in FIG. 2, which shows the standard terminals NA1 and NA2 for the "cycle request" signal ZA and the "cycle acknowledgement" signal ZQ. These signals are transmitted in inverted form, because it has been proven that this is more favorable from the transmission point of view. The comparator V1 for the signal ZA is connected with the signal lines ZA1 and ZA2 by two contacts K1 and K2. By means of these contacts, which can be operated manually or by program control, the comparator V1 is connected to various standard terminals to be paralleled. FIG. 2 illustrates the aforementioned selectivity of the connections of the comparators to the standard terminals with which they are associated. As is indicated by FIG. 2, and referring to FIG. 1, the comparator V1 is constructed to be connectable between standard terminals NA1 and NA2 or NA3 and NA4. Switch contacts K1 and K2 provide for this selectivity. In the same manner the comparator V2 is selectively connectable between standard terminals NA5 and NA6 or standard terminals NA7 and NA8. As a third signal, the signal "comparator one" VE is routed to the comparator V1. The signal VF supplied by the comparator V1 and the signals ZA1 and ZA2 are routed to the storage unit S1 which, as described above, is made up of the storage operation control SOPS, storage request control SAFS, program request control PAFS and the core storage KS.

The storage operation control is of known construction, and a detailed description thereof is given in U.S. Pat. No. 3,660,824. The storage request control may be constructed in accordance with the description of a similar unit given in commonly assigned U.S. application Ser. No. 57,926, filed July 24, 1970 and now U.S. Pat. No. 3,711,835. A conventional core storage of any desired arrangement may be used to form core storage KS.

By closing the contacts K1 and K2, the comparator V1 is connected to standard terminals NA1 and NA2, which are independent in themselves. Two operational modes are possible. If the comparator is switched off (VE = "0"), each standard terminal is operated independently of the others. The cycle request, on being operated upon, leads to a cycle acknowledgement to the selected processing unit. Cycle requests are operated upon independently of the priority in the storage. The "comparison error" signal VF always has the value "0". If the comparator VI is inserted in the circuit (VE = "1"), the standard terminals NA1 and NA2 are in the parallel mode. If there is a simultaneous cycle request through the processing units connected to the two standard terminals, the storage request control SAFS registers only the cycle requests of the standard terminal having a higher priority than the priority in the storage, viz. of the standard terminal NA1.

The signals of the processing unit VE1 connected to the standard terminal NA1 are operated upon and simultaneously compared with the signals of the parallel-connected processing unit VE2. The transmission of the signals from the storage unit S1 to the parallel-operated processing units VE1 and VE2 takes place concurrently. It is readily apparent from the circuit diagram of the comparator V1 that if VE = "1" (comparator switched in), the comparison error signal VF takes the value "0", and if equal potentials are found on the signal lines ZA1 and ZA2, and that the signal VF takes the value "1", if said potentials are unequal. If, furthermore, the cycle acknowledgement signal is transmitted on the line ZQ1, then this also appears on the line ZQ2, because if VE = "1", the coincidence gate integrated into the gate G1 is through-connected by the signal on the line ZQ1.

The changeover from the comparator-switched-off state to the comparator-switched-in state is performed manually or by program control in the following manner. As described in West German patent specification 1,300,138, the program request control PAFS of the storage unit S1 contains a program request register in which the processing units set a bit, if they request a program in another processing unit. This register contains also at least one bit for the parallel operation, which is set either manually or by program control in a first processing unit to be connected in parallel. A control area is allocated to this bit for the parallel operation, in which it is noted which second processing unit shall be paralleled with the processing unit requesting the parallel operation. The second processing unit checks the register interconnection for the parallel mode and communicates with the control area. In this way, a signal indication concerning the request for the parallel mode is found in the two processing units which are to be connected in parallel.

However, before the parallel mode can be initiated, the two processing units must be in the same identical states. To achieve this purpose, a program is run in both processing units as a first step, by which all the registers are placed in the same state. This means that in case of program interruption the data characterizing the state of the currently operating programs must be introduced into the storage unit. Such a program, by which the registers of the two processing units are "depleted", can be initiated manually or by program control. Upon termination of this "depletion program," the comparator can be inserted in the circuit by a signal VE from the register interconnection for the parallel mode of the program request register, thereby placing the two standard terminals in the parallel mode. Due to the simultaneous takeover of the program requests by the processing units, the latter start the program operation synchronously with one another. In the case of simultaneous cycle requests, the storage request control SAFS selects the processing unit having a higher priority in the storage and transfers the data thereof to the storage unit. The information offered by the parallel-connected unselected processing unit only serves for comparison purposes. Conversely, the two processing units take the same information from the storage.

A selective connection of comparators is also possible whenever three identical system units are operated in the parallel mode.

If a malfunction occurs in one of the three system units, the faulty system unit is located and switched off, but without interrupting the program operation. In this system, three comparators having a following majority logic is required per bit (see West German Patent Application Ser. No. 2202231.7).

The method for processing units described hereinabove can likewise be applied to storage units. In this case, a requisite condition would be that a processing unit operate two storage units having dissimilar units of information asynchronously with one another. The number of storage cycles available per unit of time would thereby be doubled, making it possible to proceed to the synchronous mode with identical storage contents. At the instant of transition, the two storage units would have to be at rest and identical with regard to applied cycle requests from other processing units. In this case, too, it would be possible to jumper comparators.

The description of a preferred embodiment given hereinabove is given only to provide an illustration of the principles of the invention and is not to be considered as defining the scope of the invention. The scope of the invention is defined by the appended claims.

I claim:
1. In program-controlled data processing apparatus wherein central processing system units are in communication with central storage system units, at least two identically constructed processing units having data terminals thereon connected to operate in a parallel manner with the data terminals of at least two identically constructed central storage units, and at least two identically constructed central storage units having data terminals thereon connected to operate in a parallel manner with the data terminals of at least two of said identically constructed processing units, such that the respective system units perform identical functions concurrently and in synchronism and wherein bits of information supplied by those of said system units operating in parallel are compared and in case of malfunction or disturbance a fault indicating signal is produced, the improvement comprising:
 a plurality of comparator circuit means, at least one of which is associated with each said system unit and is connectable to the data terminals of that system unit,
 each said comparator means including switching means for selectively additionally connecting that comparator means to others of said system units being operated in parallel.

* * * * *